US008861967B2

(12) United States Patent
Yu et al.

(10) Patent No.: US 8,861,967 B2
(45) Date of Patent: Oct. 14, 2014

(54) RECONFIGURABLE OPTICAL ADD/DROP MULTIPLEXER AND RECONFIGURABLE OPTICAL ADD/DROP MULTIPLEXING METHOD

(75) Inventors: Shaohua Yu, Wuhan (CN); Shanhong You, Wuhan (CN); Gangxiang Shen, Wuhan (CN); Zhu Yang, Wuhan (CN); Qi Yang, Wuhan (CN)

(73) Assignee: Wuhan Research Institute of Posts and Telecommunications, Wuhan, Hubei Province (CN)

( * ) Notice: Subject to any disclaimer, the term of this patent is extended or adjusted under 35 U.S.C. 154(b) by 62 days.

(21) Appl. No.: 13/333,331

(22) Filed: Dec. 21, 2011

(65) Prior Publication Data

US 2012/0294618 A1 Nov. 22, 2012

(30) Foreign Application Priority Data

May 19, 2011 (CN) .......................... 2011 1 0130697

(51) Int. Cl.
H04J 14/02 (2006.01)
H04B 10/275 (2013.01)
(52) U.S. Cl.
CPC .......... *H04B 10/275* (2013.01); *H04J 14/0212* (2013.01); *H04J 14/0204* (2013.01); *H04J 14/0213* (2013.01); *H04J 14/0217* (2013.01)
USPC .................. 398/83; 398/79; 398/45; 398/48; 398/49; 385/24; 385/16; 385/17; 385/18
(58) Field of Classification Search
USPC ........... 398/83, 79, 45, 48, 84, 85, 82, 49, 76, 398/59; 385/24, 16, 17, 18, 37
See application file for complete search history.

(56) References Cited

U.S. PATENT DOCUMENTS 7,620,321 B2 * 11/2009 Miura et al. .................... 398/45
2006/0098981 A1    5/2006 Miura et al.
2011/0268442 A1 * 11/2011 Boertjes et al. ............... 398/48
2011/0286746 A1 * 11/2011 Ji et al. ............................ 398/83

FOREIGN PATENT DOCUMENTS

CN       101141221 A3   3/2008
WO    WO 2011/044371 A4   4/2011

OTHER PUBLICATIONS

First Office Action dated Jun. 19, 2014 in corresponding Chinese application 201110130697.0 (19 pages including English translation).

* cited by examiner

*Primary Examiner* — Hanh Phan
(74) *Attorney, Agent, or Firm* — Brinks Gilson & Lione; G. Peter Nichols

(57) ABSTRACT

A reconfigurable optical add/drop multiplexer and a reconfigurable optical add/drop multiplexing method are provided. The reconfigurable optical add/drop multiplexer comprises: an optical processing unit for receiving a first optical signal containing a plurality of optical channels, processing the first optical signal to generate a second optical signal which is a part of the first optical signal, and outputting the second optical signal; and a coherent detection unit for performing a coherent detection on the second optical signal so as to separate from the second optical signal an optical channel contained therein, and outputting the optical channel. With the reconfigurable optical add/drop multiplexer and the reconfigurable optical add/drop multiplexing method, any number of degrees can be supported, and adding/dropping of an optical channel with any wavelength and any bandwidth to/from any direction can be achieved, so that requirements of being colorless, directionless, contentionless and gridless can be satisfied.

7 Claims, 5 Drawing Sheets

RECONFIGURABLE OPTICAL ADD/DROP MULTIPLEXER AND RECONFIGURABLE OPTICAL ADD/DROP MULTIPLEXING METHOD

This application is based upon and claims the benefit of priority from the prior Chinese Patent Application CN201110130697.0, filed in the State Intellectual Property Office of the P.R.C. on May 19, 2011, the disclosure of which is hereby incorporated by reference in its entirety.

FIELD OF THE INVENTION

The present invention generally relates to an optical add/drop multiplexing technology in the optical communication field, and particularly to a reconfigurable optical add/drop multiplexer and a reconfigurable optical add/drop multiplexing method.

DESCRIPTION OF RELATED ART

In recent years, more and more new types of telecommunication services have appeared. These new types of telecommunication services bring people's increasing demand of network bandwidths. As compared to conventional telecommunication services, these new types of telecommunication services often have higher dynamic characteristics and unpredictability, and thus require an optical network serving as a transmission physical layer, to provide higher flexibility. Meanwhile, maturing of ultra-long-distance Dense Wavelength Division Multiplexing (DWDM) systems renders that a bottleneck of network services transfers from bandwidth construction to bandwidth management. On a core network node, often tens of or even hundreds of wavelengths have to be handled, and a capability of ultra-long-distance transmission requires more nodes to have the capability of adding/dropping more wavelengths.

Appearance of optical add/drop multiplexers (OADMs) causes evolution of the optical network from a point-to-point networking to a ring networking, and reconfigurable optical add/drop multiplexers (ROADMs) not only can achieve adding/dropping of optical channels and cross-scheduling at a wavelength level among the optical channels on one node as traditional OADMs do, but also can achieve configuration and adjustment of wavelengths to be added/dropped completely by software. At present, ROADMs can be implemented by Wavelength Blockers (WB), Planar Lightwave Circuit (PLC), or Wavelength Selective Switches (WSS). However, in existing ROADMs, a plurality of WSSs or WBs have to be cascaded in order to meet requirements of being colorless, directionless, contentionless and gridless, which renders that the ROADMs have complicated structures and high costs.

On the other hand, the Coherent Optical Orthogonal Frequency-Division Multiplexing (CO-OFDM) technology draws increasingly wide attention in ultra-long-distance, ultra-large-capacity and ultra-high-speed transmission systems due to its advantages, such as an efficient and flexible frequency spectrum and a capability of effectively estimating and compensating for Chromatci Dispersion (CD) and Polarization Mode Dispersion (PMD), etc. Although application of this technology is limited to point-to-point transmission systems, CO-OFDM-based optical communication network technologies are currently being studied.

Therefore, there is a need for a reconfigurable optical add/drop multiplexer with a simple structure and a reconfigurable optical add/drop multiplexing method, which may be used in an optical network with an adjustable bandwidth, such as a CO-OFDM-based optical communication network.

SUMMARY OF THE INVENTION

The present invention is made in view of the above problem. An object of the present invention is to provide a reconfigurable optical add/drop multiplexer with a simple structure and a reconfigurable optical add/drop multiplexing method, which may be used in an optical network with an adjustable bandwidth, such as a CO-OFDM-based optical communication network.

According to an aspect of the present invention, there is provided a reconfigurable optical add/drop multiplexer comprising: an optical processing unit for receiving a first optical signal containing a plurality of optical channels, processing the first optical signal to generate a second optical signal which is a part of the first optical signal, and outputting the second optical signal; and a coherent detection unit for performing a coherent detection on the second optical signal so as to separate from the second optical signal an optical channel contained therein, and outputting the optical channel.

According to another aspect of the present invention, there is provided a reconfigurable optical add/drop multiplexing method used in a reconfigurable optical add/drop multiplexer, comprising: receiving a first optical signal containing a plurality of optical channels, processing the first optical signal to generate a second optical signal which is a part of the first optical signal, and outputting the second optical signal; and performing a coherent detection on the second optical signal so as to separate from the second optical signal an optical channel contained therein, and outputting the optical channel.

The reconfigurable optical add/drop multiplexer and the reconfigurable optical add/drop multiplexing method according to the above aspects of the present invention can be extended to support any number of degrees, and can add/drop optical channels with any wavelengths and any bandwidths to/from any directions, so as to meet the requirements of being colorless, directionless, contentionless and gridless when used in an optical network with an adjustable bandwidth.

BRIEF DESCRIPTION OF THE DRAWINGS

The above and other objects, features, and advantages of the present invention will become more apparent from the detailed description of embodiments of the present invention in conjunction with the attached drawings, in which.

DETAILED DESCRIPTION OF THE INVENTION

A reconfigurable optical add/drop multiplexer and a reconfigurable optical add/drop multiplexing method according to an embodiment of the present invention will be described below with reference to the accompanying drawings. Throughout the drawings, like reference signs represent like elements. It is to be understood that the embodiments described herein are only illustrative, and should not be construed as limiting the scope of the invention.

The ROADM according to an embodiment of the present invention may contain one or more degrees, and can be further extended as required to contain any number of degrees. Each degree corresponds to a pair of fiber links, i.e. an ingress link and an egress link. Each ROADM can act as a node in an optical communication network to add/drop optical channels from a plurality of directions.

Hereinafter, a ROADM according to a first embodiment of the present invention will be described with reference to FIG. 1. The ROADM contains three degrees, by way of example, which are represented by three directions, i.e. West (W), North (N), and East (E), respectively. Each of the degrees has one ingress link (fiber) and one egress link (fiber), and the ingress link and the egress link are connected to other nodes in the network.

Figure 1:
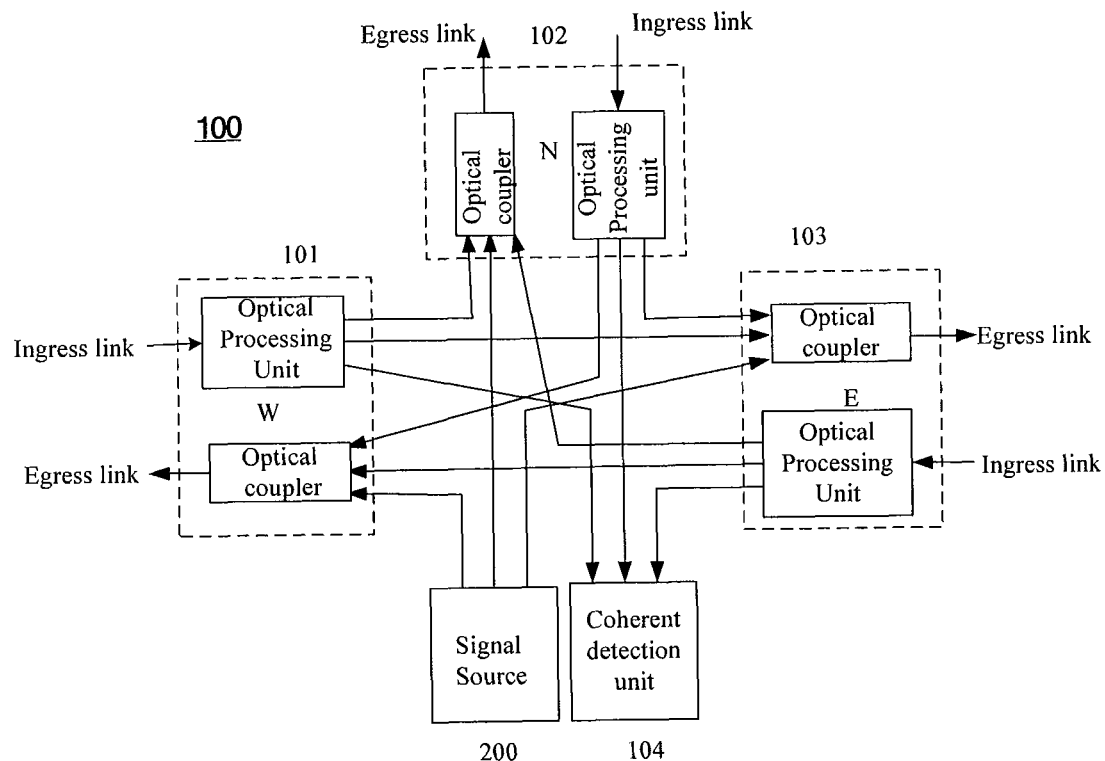
FIG. 1 is a block diagram showing a reconfigurable optical add/drop multiplexer (ROADM) according to a first embodiment of the present invention.

As shown in FIG. 1, the ROADM 100 according to the first embodiment of the present invention comprises add/drop multiplexing modules corresponding to the three degrees respectively (i.e. an add/drop multiplexing module 101 corresponding to West, an add/drop multiplexing module 102 corresponding to North and an add/drop multiplexing module 103 corresponding to East), and a coherent detection unit 104 connected to these three add/drop multiplexing modules.

Each of the add/drop multiplexing modules 101, 102 and 103 includes an optical amplifier (not shown in FIG. 1) and an optical processing unit for a drop section, and an optical coupler and an optical amplifier (not shown in FIG. 1) for an add section. The add/drop multiplexing modules also include input ports and output ports, in which the output ports of the add/drop multiplexing module of each degree are connected to the input ports of the add/drop multiplexing modules of other degrees, and the input ports of the add/drop multiplexing module of each degree are connected to the output ports of the add/drop multiplexing modules of other degrees. Each of the add/drop multiplexing modules 101, 102 and 103 is connected to the coherent detection unit 104 through a drop port of the respective add/drop multiplexing module, and to a signal source 200 through a channel add port.

Figure 2:
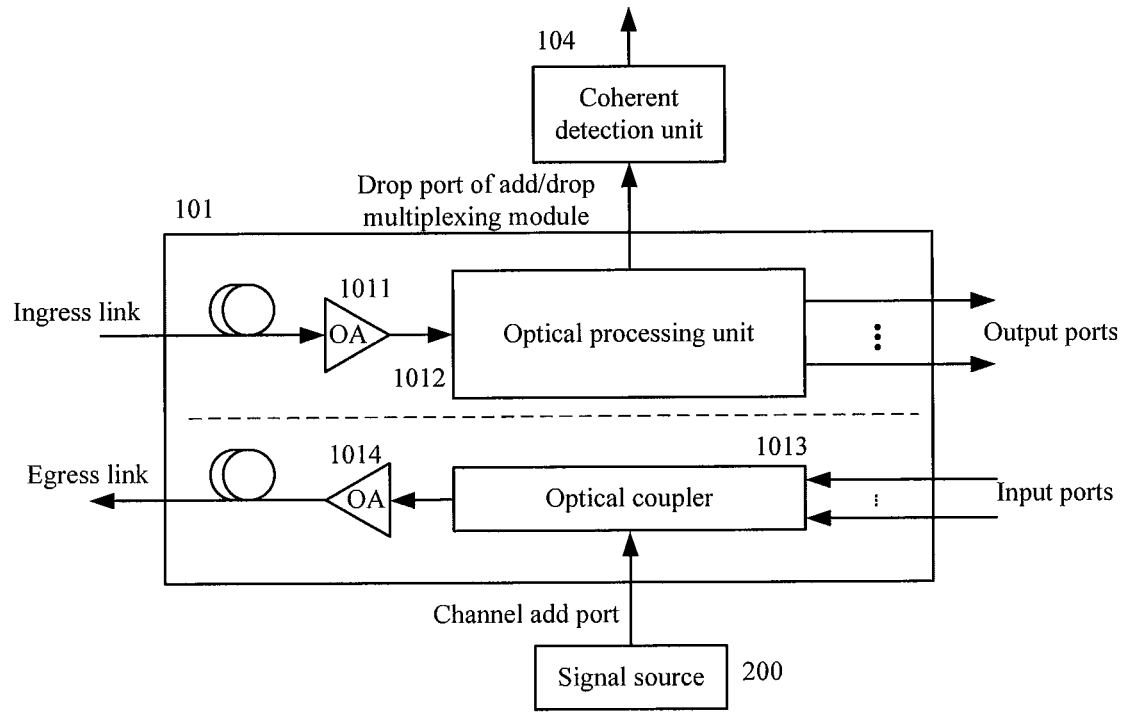
FIG. 2 is a block diagram showing an add/drop multiplexing module for one degree in the ROADM shown in FIG. 1.

FIG. 2 shows a block diagram of one degree of the ROADM shown in FIG. 1 in more detail. Since the three degrees shown in FIG. 1 are substantially the same in structure and operation, the W degree (add/drop multiplexing module) 101 is used as an example in FIG. 2 for the purpose of illustration. The connection relationship of the add/drop multiplexing modules 102 and 103 are not shown in FIG. 2 for simplicity.

As shown in FIG. 2, the add/drop multiplexing module 101 includes a drop section and an add section, which are separated from each other by a dotted line in FIG. 2. The drop section is shown in the upper side of FIG. 2, and it receives an optical signal (e.g. OFDM optical signal) containing a plurality of optical channels destined to one or more destinations from outside (for example, other nodes) through the ingress link, and cooperates with the coherent detection unit 104 to separate an optical channel which needs to be dropped at a local node (that is, the network node formed by the ROADM shown in FIG. 1) from the optical signal. The add section is shown in the lower side of FIG. 2, and it couples an optical channel to be added, which is generated by the signal source 200, into an optical signal from other degrees, so as to send it to other nodes in the network.

The drop section of the add/drop multiplexing module 101 will be described first. In the drop section, the add/drop multiplexing module 101 includes an optical amplifier (OA) 1011 and an optical processing unit 1012.

The optical amplifier 1011 receives and amplifies the optical signal inputted to the add/drop multiplexing module 101 through the ingress link, and outputs the amplified optical signal to the optical processing unit 1012.

The optical processing unit 1012 receives the amplified optical signal, and performs predetermined processing on it, so that the processed optical signal is divided into two parts, one part being outputted to the coherent detection unit 104 through the drop port of the add/drop multiplexing module, and the other part being outputted to the output ports which, as shown in FIG. 1, are connected to the input ports of the add/drop multiplexing modules of other degrees, for example. As described below, depending on particular implementations of the optical processing unit, the optical signal outputted to the drop port of the add/drop multiplexing module includes all of the optical channels, or one or more optical channels to be dropped at the local node; accordingly, the optical signal outputted to the output ports includes all of the optical channels, or the optical channels bypassing the local node (i.e. the optical channels which are not to be dropped at the local node). Although only one drop port of the add/drop multiplexing module is shown in FIG. 2, a plurality of drop ports can be provided in the add/drop multiplexing module according to the number of the optical channels to be dropped at the local node, and the optical signal outputted to each drop port of the add/drop multiplexing module can also contain a plurality of optical channels. In addition, the number of the output ports can be changed according to the number of degrees contained in the ROADM, for example.

Each drop port of the add/drop multiplexing module is connected to the coherent detection unit 104. The coherent detection unit 104 receives the optical signal processed by the optical processing unit 1012 via the drop port of the add/drop multiplexing module, performs a coherent detection on the received optical signal to separate from the received optical signal an optical channel contained in the optical signal, and outputs the optical channel so as to achieve the dropping of the optical channel. The separated optical channel is outputted to a local receiving device or signal processing device (not shown in FIG. 2) for further processing.

Hereinafter, a principle of the coherent detection unit 104 will be described with reference to FIG. 3.

Figure 3:
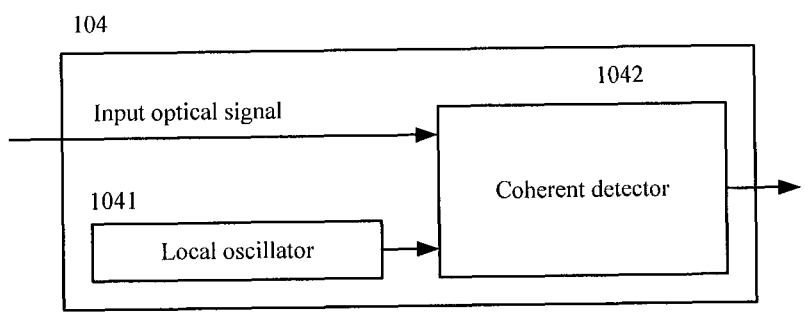
FIG. 3 is a block diagram showing a coherent detection unit shown in FIG. 2.

As shown in FIG. 3, the coherent detection unit 104 includes a local oscillator 1041 for generating a local oscillating light at a local oscillating frequency; and a coherent detector 1042 for performing the coherent detection on the optical signal inputted to the coherent detection unit 104 to separate from the optical signal the optical channel contained therein, and outputting the separated optical channel. The local oscillator 1041 is continuously adjustable, that is, the local oscillator 1041 can be tuned continuously to change the local oscillating frequency of the local oscillating light.

Thereby, it is possible to separate the optical channels with various wavelengths by tuning the local oscillating frequency and then performing the coherent detection with the tuned local oscillating frequency, so that the dropping of the optical channels with various wavelengths can be achieved.

The coherent detection unit 104 (particularly, the coherent detector 1042) can perform the above coherent detection by using any coherent detection method commonly known in the art. A particular example of the coherent detection unit 104 is given in FIG. 4.

Figure 4:
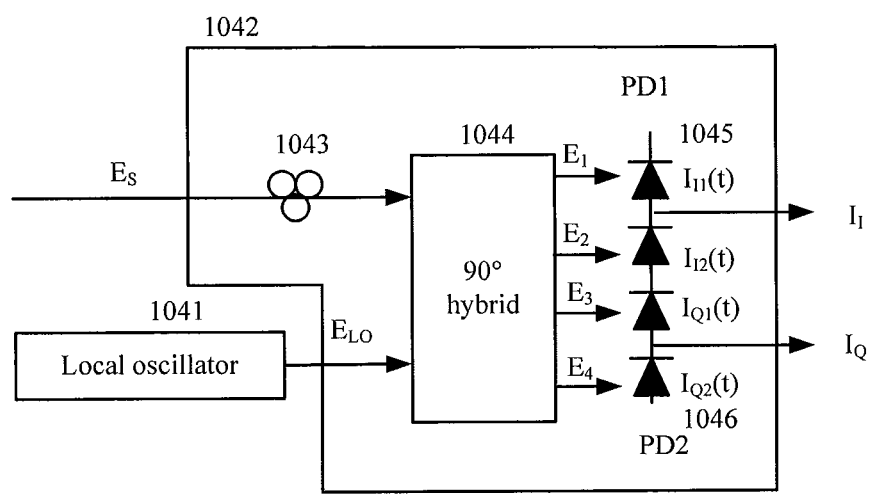
FIG. 4 is a diagram showing a particular example of the coherent detection unit shown in FIG. 2.

As shown in FIG. 4, the coherent detection unit 104 includes a local oscillator 1041 and a coherent detector 1042. The coherent detector 1042 further includes a polarization controller 1043, a hybrid 1044 and balanced receivers 1045 and 1046.

The optical signal (hereinafter referred to as signal light $E_S$) inputted to the coherent detection unit 104 is inputted to an input terminal for signal light of the 90° hybrid 1044 after passing through the polarization controller 1043. The local oscillating light $E_{LO}$ at the local oscillating frequency generated by the local oscillator 1041 is inputted to an input terminal for local oscillating light of the 90° hybrid 1044. The signal light and the local oscillating light are then mixed in the 90° hybrid 1044, and are outputted to the balanced receivers 1045 and 1046 in for example four ways so as to achieve an optical-to-electrical conversion, thereby separating the optical channel in the signal light.

Particularly, the signal light $E_S$ and the local oscillating light $E_{LO}$ can be respectively expressed as:

$$E_S = A_S(t)\exp(j\omega_s t) \quad (1)$$

$$E_{LO} = A_{LO}(t)\exp(j\omega_{LO}t) \quad (2)$$

where $A_S$ and $A_{LO}$ represent complex amplitudes of the signal light and the local oscillating light, respectively, and $\omega_s$ and $\omega_{LO}$ represent angular frequencies of the signal light and the local oscillating light, respectively. Light powers of the signal light and the local oscillating light are $P_S = |A_S|^2/2$ and $P_{LO} = |A_{Lo}|^2/2$, respectively. So the outputs of the 90° hybrid 1044 can be expressed as:

$$E_1 = \frac{1}{2}(E_S + E_{LO}), \quad (3)$$

$$E_2 = \frac{1}{2}(E_S - E_{LO}), \quad (4)$$

$$E_3 = \frac{1}{2}(E_S + jE_{LO}), \quad (5)$$

$$E_4 = \frac{1}{2}(E_S - jE_{LO}), \quad (6)$$

Light currents outputted from photo-detectors PD1 and PD2 in the balanced receivers 1045 and 1046 may be respectively expressed as:

$$I_{I1} = R[\text{Re}\{E_1\}]^{ms} \quad (7)$$
$$= \frac{R}{4}[P_S + P_{LO} + 2\sqrt{P_S P_{LO}}\cos\{\omega_{IF} + \theta_{Sig} - \theta_{LO}\}],$$

$$I_{I2} = R[\text{Re}\{E_2\}]^{ms} \quad (8)$$
$$= \frac{R}{4}[P_S + P_{LO} - 2\sqrt{P_S P_{LO}}\cos\{\omega_{IF} + \theta_{Sig} - \theta_{LO}\}],$$

$$I_{Q1} = R[\text{Re}\{E_3\}]^{ms} \quad (9)$$
$$= \frac{R}{4}[P_S + P_{LO} + 2\sqrt{P_S P_{LO}}\sin\{\omega_{IF} + \theta_{Sig} - \theta_{LO}\}],$$

$$I_{Q2} = R[\text{Re}\{E_4\}]^{ms} \quad (10)$$
$$= \frac{R}{4}[P_S + P_{LO} - 2\sqrt{P_S P_{LO}}\sin\{\omega_{IF} + \theta_{Sig} - \theta_{LO}\}],$$

where R is a response factor of the photo-detectors PD1 and PD2, $\theta_{Sig}$ and $\theta_{LO}$ represent phases of the signal light and the local oscillating light, respectively, and $$\omega_{IF} = \omega_S - \omega_{LO}, \quad (11)$$

Then, values of the light currents outputted from the balanced receivers 1045 and 1046 are respectively:

$$I_I = I_{I1} - I_{I2} = R\sqrt{P_S P_{LO}}\cos\{\omega_{IF} + \theta_{Sig} - \theta_{LO}\}, \quad (12)$$

$$I_Q = I_{Q1} - I_{Q2} = R\sqrt{P_S P_{LO}}\sin\{\omega_{IF} + \theta_{Sig} - \theta_{LO}\}, \quad (13)$$

Therefore, the optical channel (i.e. the optical channel which is separated to be dropped) detected by the coherent detection unit 104 can be expressed as:

$$I_C = I_I + jI_Q = R\sqrt{P_S P_{LO}}\exp j\{\omega_{IF} + \theta_{Sig} - \theta_{LO}\}, \quad (14)$$

The optical channel in the optical signal inputted to the coherent detection unit 104 can be sequentially separated by tuning the frequency of the local oscillating light, so that the dropping of the optical channels with different wavelengths may be realized.

Turning back to FIG. 2, the add section of the add/drop multiplexing module 101 will be described hereinafter. In the add section, the add/drop multiplexing module 101 includes an optical coupler 1013 and an optical amplifier 1014.

The optical coupler 1013 receives an optical channel from the signal source 200 through the channel add port, receives optical signal(s) from other degree(s) through the input port(s) connected to the other degree(s) (for example, the add/drop multiplexing modules 102 and 103 corresponding to the N and E degrees, respectively), and couples the optical channel into the optical signal(s) (i.e. couples the optical channel and the optical signal(s)). The coupled optical signal into which the optical channel is coupled is amplified by the optical amplifier 1014 and then is outputted to other nodes. Preferably, an optical amplifier is arranged between the signal source 200 and the channel add port to amplify the optical channel generated by the signal source 200.

In the first embodiment of the present invention, both the adding and dropping can be based on the CO-OFDM technology. The optical OFDM technology can assign different frequency spectrums and data rates to optical channels flexibly by changing the number of loaded OFDM sub-carriers and their respective modulation formats. Therefore, in the present embodiment, the signal source 200 may be a coherent transmitter adopting the CO-OFDM technology to generate the optical channel to be added. It should be noted that the number of the signal source 200 may be varied according to the number of the optical channels to be added, although only one signal source 200 is shown in FIGS. 1 and 2. Each of the signal sources 200 includes a local oscillator (not shown) for generating a local oscillating light at a local oscillating frequency for signal modulation. By tuning the local oscillating frequency, a frequency of the generated optical channel can be changed, so that the optical channels generated by the respective signal sources 200 and added have different frequencies so as to avoid frequency collision.

As described above, in the ROADM 100 according to the first embodiment of the present invention, the coherent detection technology is used in the drop section to achieve filtering of the optical channel. By tuning the local oscillating frequency of the local oscillator in the coherent detection unit 104, the optical channels of different frequencies can be separated, so as to achieve the dropping of an optical channel of any frequency.

It should be appreciated that various variations can be made to the ROADM according to the first embodiment of the invention without departing from the scope of the present invention. For example, although it is mentioned that the add/drop multiplexing module 101 includes optical amplifiers 101 and 105 when each of the degrees of the ROADM 100 is described by using the add/drop multiplexing module 101 as an example, these two optical amplifiers can be removed. In addition, in the drop direction, when there are many optical channels contained in the input optical signal, an optical splitter can be connected at the drop port of the add/drop multiplexing module so as to further split the optical signal outputted to each drop port of the add/drop multiplexing module into a plurality of optical beams, and one coherent detection unit is used to perform the coherent detection on each of the optical beams. In this case, an optical amplifier may also be deployed between the optical splitter and each coherent detection unit to increase the power of each optical beam.

There are many implementations for each of the add/drop multiplexing modules in the ROADM 100 according to the first embodiment of the present invention. A first implementation of the add/drop multiplexing module of a degree shown in FIG. 2 will be described below with reference to FIG. 5. The add section of the first implementation is same as that described with reference to FIG. 2, and thus is not described here.

The add/drop multiplexing module 101 of the first implementation is based on a bandwidth-variable wavelength selective switch (BV-WSS); that is, in the drop section, a BV-WSS is used to implement the optical processing unit 1012 (hereinafter, referred to as BV-WSS 1012'). The BV-WSS 1012' is connected to the coherent detection unit 104 through the drop port of the add/drop multiplexing module.

Figure 5:
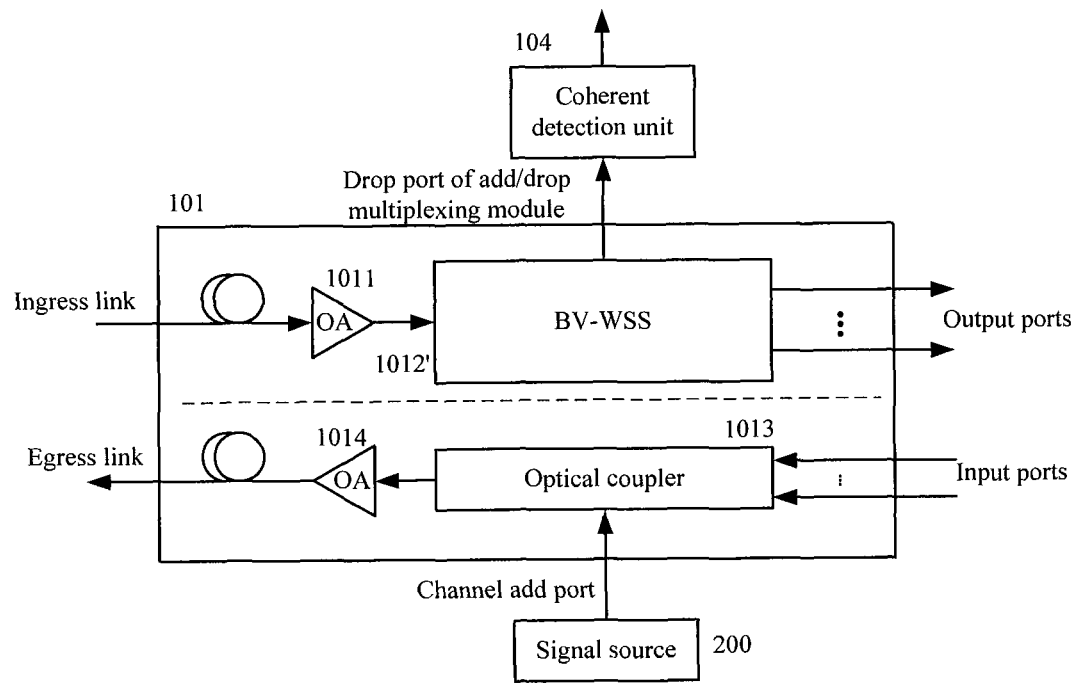
FIG. 5 is a block diagram showing a first implementation of the add/drop multiplexing module shown in FIG. 2.

As shown in FIG. 5, the optical signal containing a plurality of optical channels inputted to the add/drop multiplexing module 101 of the ROADM 100 is amplified by the optical amplifier 1011 and then is inputted to the BV-WSS 1012'.

The BV-WSS 1012' serves as a filter, which filters the optical signal amplified by the optical amplifier 1011 to filter out (remove) the optical channel that is not within its passband.

A central frequency and a bandwidth of the BV-WSS 1012' may be set according to spectrum characteristics of the input optical signal. Specifically, for each drop port of the add/drop multiplexing module, the passband or passband combination of the BV-WSS 1012' can be adjusted at a certain granularity (for example, at a granularity of 1 GHz) to change the optical channel(s) contained in the filtered optical signal outputted from the BV-WSS 102', so that the optical channel which needs to be dropped at the local node are located in the passband or passband combination of the BV-WSS 1012'. When the optical signal is inputted to the BV-WSS 1012', the optical channel which needs to be dropped at the local node and other optical channels (if any) with frequencies in the passband or passband combination are outputted to the drop port of the add/drop multiplexing module, and the optical channels with frequencies which are not in the passband or passband combination are outputted to the output ports to be outputted to other degrees.

Figure 6:
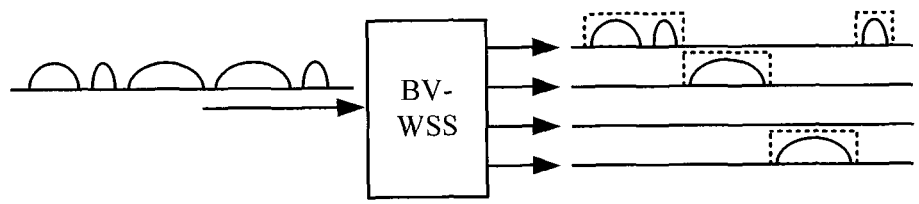
FIG. 6 is a diagram schematically showing a spectrum of a wavelength selective switch shown in FIG. 5.

FIG. 6 schematically shows a frequency spectrum of the BV-WSS shown in FIG. 5. In the example of FIG. 6, the BV-WSS is connected to a plurality of (for example, 4) drop ports of the add/drop multiplexing module. The optical signal containing 5 optical channels enters into the BV-WSS, and is filtered according to the passband configuration of the BV-WSS and then is outputted to different drop ports of the add/drop multiplexing module. Specifically, the passband combination of BV-WSS (shown by the dotted block) is adjusted such that for the first drop port of the add/drop multiplexing module, two separate passbands are used to filter the optical signal so as to output a filtered optical signal containing three optical channels; for the second drop port of the add/drop multiplexing module, one passband is used to filter the optical signal so as to output a filtered optical signal containing one optical channel; for the third drop port of the add/drop multiplexing module, all of the optical channels are filtered out (removed); and for the fourth drop port of the add/drop multiplexing module, one passband is used to filter the optical signal so as to output a filtered optical signal containing one optical channel. Also, as shown in FIG. 5, central frequencies and bandwidths of the passbands for the respective drop ports of the add/drop multiplexing module may be different. Thereby, different bandwidths of the optical channels to be dropped can be accommodated flexibly by this BV-WSS, so that the ROADM according to the embodiment of the present invention supports elastic bandwidth characteristics. It should be noted that the BV-WSS 1012' can be provided as a band stop filter as required, although it is described as a band pass filter in the above.

The coherent detection unit 104 performs a coherent detection on the optical signal received from the BV-WSS 1012' through the drop port of the add/drop multiplexing module, so as to separate the respective optical channels contained in the received optical signal. The manner in which the coherent detection unit 104 performs the coherent detection is same as that described above, and thus the detailed description thereof is omitted. Likewise, when there are many optical channels contained in the optical signal outputted to each drop port of the add/drop multiplexing module, the optical splitter and the optical amplifier described above can be added after each drop port of the add/drop multiplexing module.

In the ROADM 100 (that is, the BV-WSS-based ROADM) comprises a plurality of add/drop multiplexing modules of the first implementation, the BV-WSS is used as a first-stage filter and the coherent detection unit is used as a second-stage filter. Adding and dropping of the optical channel with any wavelength and any bandwidth can be achieved by changing the pass band of the wavelength selective switch and the local oscillating frequency in the coherent detection unit.

A second implementation of the add/drop multiplexing module shown in FIG. 2 will be described below with reference to FIG. 7. The add section of the second implementation is same as that described with reference to FIG. 2, and thus is not described here.

In the add/drop multiplexing module 101 of the second implementation, an optical splitter is used to implement the optical processing unit 1012 (hereinafter, referred to as the optical splitter 1012") in the drop section. The optical splitter 1012" is connected to the coherent detection unit 104 through a drop port of the add/drop multiplexing module.

Figure 7:
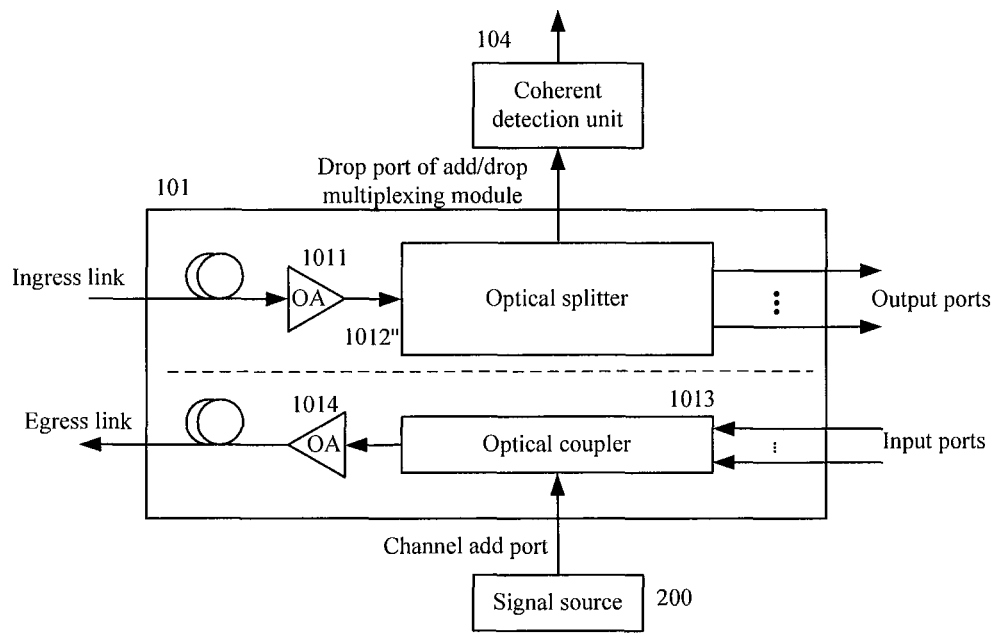
FIG. 7 is a block diagram showing a second implementation of the add/drop multiplexing module shown in FIG. 2.

As shown in FIG. 7, the optical signal containing a plurality of optical channels inputted to the add/drop multiplexing module 101 is amplified by the optical amplifier 1011 and then is inputted to the optical splitter 1012".

The optical splitter 1012" splits the optical signal amplified by the optical amplifier 1011 into a plurality of optical beams, in which a part of the optical beams are outputted to the respective output ports to be outputted to other degrees, and other part of the optical beams are outputted to the drop port of the add/drop multiplexing module. Since the optical splitter does not have a functionality of filtering, the optical beams outputted to the respective output ports and the optical beams outputted to the drop port of the add/drop multiplexing module contain all of the optical channels inputted to the add/drop multiplexing module 101, respectively.

The coherent detection unit 104 connected to the drop port of the add/drop multiplexing module performs the coherent detection (filtering) on the optical signal received through the drop port of the add/drop multiplexing module, so as to separate the respective optical channel(s) contained in the received optical signal. The manner in which the coherent detection unit 104 performs the coherent detection is same as that described above, and a detailed description thereof is omitted.

Unlike the BV-WSS in the first implementation, in the second implementation, the optical splitter does not have a capability of filtering and thus cannot filter certain optical channels in the optical signal out, so the ROADM of the second implementation depends totally on a wavelength selecting capability of the coherent detection unit to realize the functionality of filtering. That is, all of the optical channels in the input optical signal are sent to the drop port of the add/drop multiplexing module, and the coherent detection unit separates the optical channel to be dropped from the optical signal by performing the coherent detection.

As compared with the BV-WSS-based ROADM, the ROADM (i.e. the ROADM without filter) formed by the add/drop multiplexing module of the second implementation does not require the expensive wavelength selective switch and thus has a reduced cost, which renders that the ROADM without filter may be widely applied to Metropolitan Area Networks or Local Area Networks having a smaller coverage and requiring a low cost.

On the other hand, in the ROADM without filter, all of the optical channels contained in the optical signal input to each degree are outputted to other degrees and in turn sent to other nodes, therefore the ROADM follows a so-called "drop and continue" mode; that is, even if an optical channel of a certain frequency is dropped at the local node and has reached its destination, the optical channel is still contained in the optical signal sent to other nodes, and is sent to other nodes, so that the dropped optical channel continues to exist in the optical signal sent to downstream nodes of the ROADM. This limits reuse of the optical channel dropped at the local node by the downstream nodes. In addition, there is no filter or WSS in the ROADM without filter to block Amplified Spontaneous Emission (ASE) noises accumulated in the optical signal passing through the ROADM, therefore the ROADM cannot filter out the ASE noises for the downstream nodes, rendering that the ASE noises propagate to the downstream nodes. In order to solve this problem, the ROADM without filter and the sparsely deployed BV-WSS-based ROADM are used in combination at some central nodes, so as to filter the accumulated ASE noises out while reducing the cost as much as possible.

Hereinbefore, a special coherent detection unit is provided in the ROADM 100 to achieve the dropping of the optical channel. Alternatively, it is possible to utilize a coherent detection capability of an existing coherent receiver without providing the special coherent detection unit, as shown in FIGS. 8 and 9.

Figure 8:
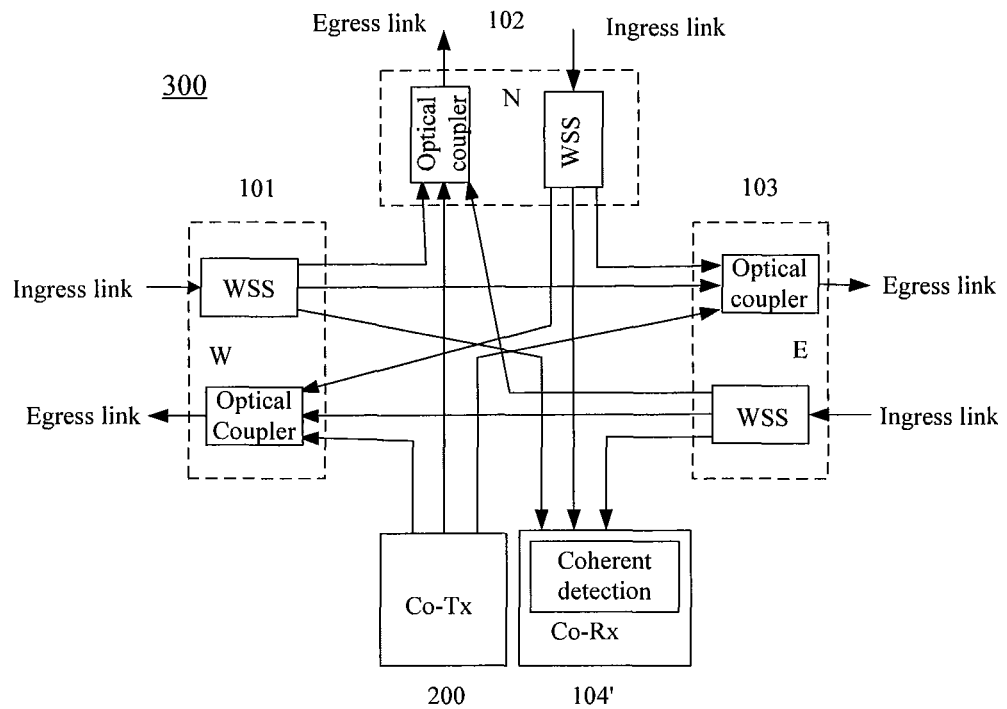
FIG. 8 is a block diagram showing a reconfigurable optical add/drop multiplexer (ROADM) according to a second embodiment of the present invention.
Figure 9:
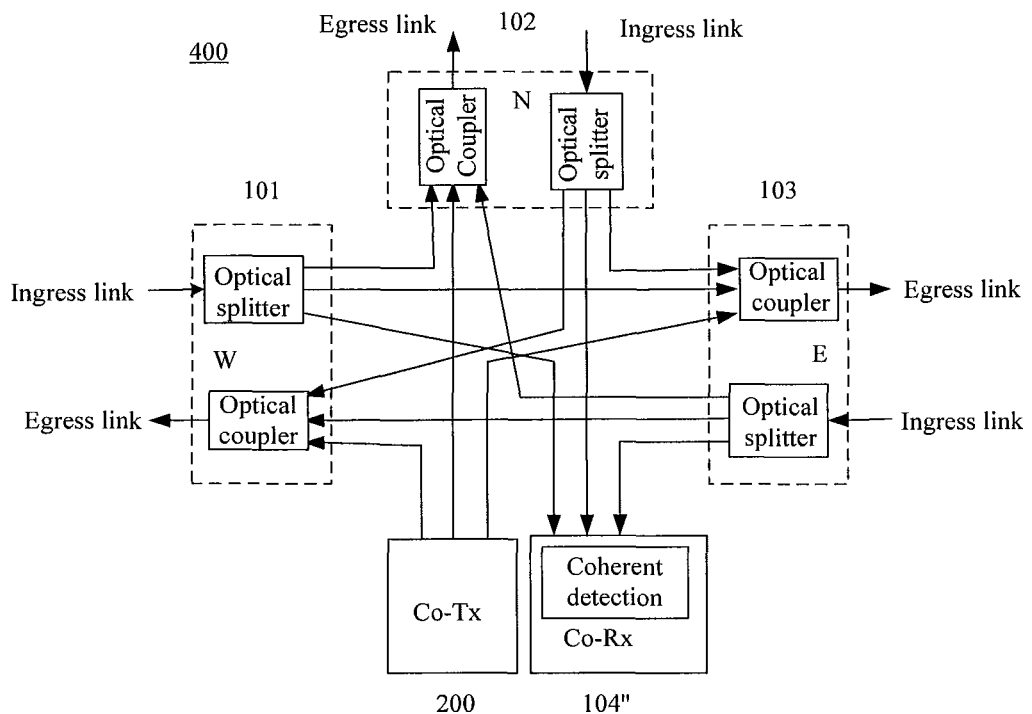
FIG. 9 is a block diagram showing a reconfigurable optical add/drop multiplexer (ROADM) according to a third embodiment of the present invention.

FIG. 8 shows a ROADM 300 according to a second embodiment of the present invention, each degree thereof being the same as that of FIG. 5. FIG. 9 shows a ROADM 400 according to a third embodiment of the present invention, each degree thereof being the same as that of FIG. 7. The ROADMs 300 and 400 differ from the ROADM 100 in that coherent detection units in the ROADMs 300 and 400 are included in coherent receivers (Co-Rx) 104' and 104", respectively, and form a part of the coherent receivers 104' and 104". In other words, the ROADMs 300 and 400 do not have coherent detection units provided individually, but directly use parts for performing the coherent detection in the coherent receivers 104' and 104" to perform the functionality of coherent detection. Therefore, the capability of filtering (coherent detection) of the receivers may be utilized sufficiently, such that the number of the individually provided optical filters is reduced, and the ROADM with a simple structure may be realized.

A reconfigurable optical add/drop multiplexing method according to an embodiment of the present invention will be described below with reference to FIG. 10. The method can be performed by the add/drop multiplexing module corresponding to each degree in the ROADM 100 shown in FIG. 1.

Figure 10:
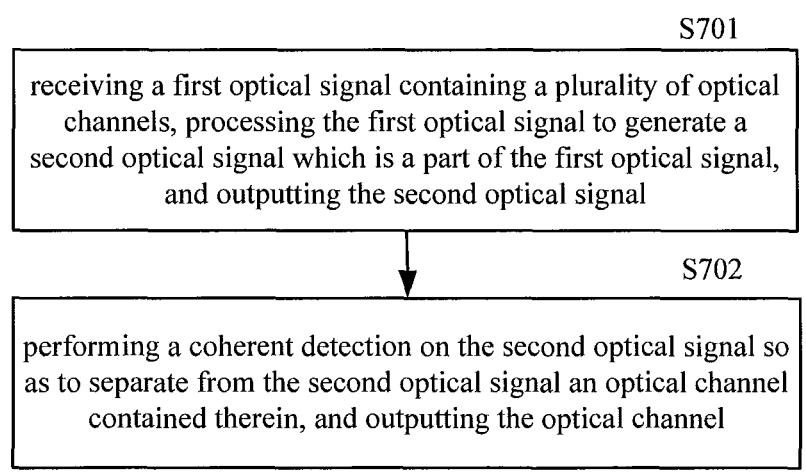
FIG. 10 is a flow diagram showing a reconfigurable optical add/drop multiplexing method according to an embodiment of the present invention.

Specifically, as shown in FIG. 10, in step S701, in the drop direction, the optical processing unit 1012 in each add/drop multiplexing module receives an input optical signal containing a plurality of optical channels, processes the input optical signal to generate a processed optical signal which is a part of the input optical signal, and outputs the processed optical signal.

As described above, the BV-WSS 1012' can be used to perform the above processing on the input optical signal, that is, to filter the input optical signal so as to filter out (remove) the optical channels which are not in its passband. Specifically, in each add/drop multiplexing module, the passband or passband combination of the BV-WSS 1012' can be adjusted at a certain granularity for each drop port of the add/drop multiplexing module, so as to change the optical channels contained in the filtered optical signal outputted from the BV-WSS 1012', so that the frequency of the optical channel which needs to be dropped at the local node is located in the passband or passband combination of the BV-WSS 1012'. Therefore, when the optical signal is inputted to the BV-WSS 1012', the optical channel which needs to be dropped at the local node and other optical channels (if any) with frequencies in the passband or passband combination are outputted to the drop port of the add/drop multiplexing module, and the optical channels with frequencies which are not in the passband or passband combination are outputted to the output ports to be outputted to other degrees.

Alternatively, the optical splitter 1012" can be used to perform said processing on the input optical signal, that is, to split the input optical signal into a plurality of optical beams, and output a part of the optical beams to the respective drop ports of the add/drop multiplexing module. The optical beams outputted to the drop ports of the add/drop multiplexing module contain all of the optical channels inputted to the add/drop multiplexing module.

Then, in step S702, the coherent detection unit 104 of each add/drop multiplexing module performs a coherent detection on the processed optical signal to separate from the processed optical signal an optical channel contained therein, and outputs the optical signal.

Specifically, as described above, it is possible to use a local oscillator to generate a local oscillating light at a local oscillating frequency, perform the coherent detection on the above processed optical signal by using the local oscillating light so as to separate from the optical signal an optical channel contained therein, and output the separated optical channel. By adjusting the local oscillating frequency, the optical channel separated from the above processed optical signal and outputted can be changed, thereby realizing the dropping of optical channels with various wavelengths.

In the add direction, it is possible to use an optical coupler to couple an optical channel generated by the signal source 200 and inputted from the add port of the reconfigurable optical add/drop multiplexer and the optical signals from other degrees, and output the coupled optical signal, thereby realizing the adding of the optical channel. The adding method is same as that described above, and thus a detailed description thereof is omitted for simplicity.

With the reconfigurable optical add/drop multiplexer and the reconfigurable optical add/drop multiplexing method according to the embodiments of the present invention, dropping of an optical channel with any wavelength and any bandwidth from any direction and adding of an optical channel with any wavelength and any bandwidth to any direction may be achieved with a simple structure. When the reconfigurable optical add/drop multiplexer and the reconfigurable optical add/drop multiplexing method according to the embodiments of the present invention are used in an optical communication network with an adjustable bandwidth, the requirements of being colorless, directionless, contentionless and gridless are satisfied. Therefore, the reconfigurable optical add/drop multiplexer can be used to build a flexible optical network.

Although the exemplary embodiments of the present invention have been shown and described, it is to be understood by those skilled in the art that various changes in form and details can be made to these exemplary embodiments without departing from the scope and spirit of the present invention as defined in the claims and equivalents thereof.

What is claimed is:

1. A reconfigurable optical add/drop multiplexer for use in a Coherent Optical Orthogonal Frequency-Division Multiplexing (CO-OFDM) network, including:
    an optical processing unit for receiving a first CO-OFDM optical signal containing a plurality of optical channels, processing the first optical signal to generate a second optical signal which is a part of the first optical signal, and outputting the second optical signal;
    a coherent detection unit for performing a coherent detection on the second optical signal so as to separate from the second optical signal an optical channel contained therein, and outputting the optical channel; and
    an optical coupler for coupling a CO-OFDM optical channel inputted from an add port of the reconfigurable optical add/drop multiplexer and optical signals from other nodes, and outputting the coupled optical signal to achieve adding of the optical channel,
    wherein the optical processing unit includes a bandwidth-variable wavelength selective switch for filtering the first optical signal and outputting the filtered first optical signal as the second optical signal, the second optical signal containing an optical channel which needs to be dropped in the plurality of optical channels, and optical channels contained in the second optical signal outputted from the wavelength selective switch being changed by adjusting a passband of the wavelength selective switch.

2. The reconfigurable optical add/drop multiplexer according to claim 1, wherein the coherent detection unit includes:
    a local oscillator for generating a local oscillating light at a local oscillating frequency; and
    a coherent detector for performing the coherent detection on the second optical signal by using the local oscillating light so as to separate from the second optical signal the optical channel contained therein, and outputting the separated optical channel.

3. The reconfigurable optical add/drop multiplexer according to claim 2, wherein the optical channel separated from the second optical signal is changed by adjusting the local oscillating frequency.

4. The reconfigurable optical add/drop multiplexer according to claim 1, wherein the coherent detection unit is a part of a coherent receiver.

5. A reconfigurable optical add/drop multiplexing method used in a reconfigurable optical add/drop multiplexer for use in a Coherent Optical Orthogonal Frequency-Division Multiplexing (CO-OFDM) network, comprising:
    receiving a first CO-OFDM optical signal containing a plurality of optical channels, processing the first optical signal to generate a second optical signal which is a part of the first optical signal, and outputting the second optical signal;
    performing a coherent detection on the second optical signal so as to separate from the second optical signal an optical channel contained therein, and outputting the optical channel; and
    using an optical coupler to couple a CO-OFDM optical channel input from an add port of the reconfigurable optical add/drop multiplexer and optical signals from other nodes, and outputting the coupled optical signal to achieve adding of the optical channel,
    wherein the step of processing the first optical signal to generate a second optical signal which is a part of the first optical signal includes: using a bandwidth-variable wavelength selective switch to filter the first optical signal and outputting the filtered first optical signal as the second optical signal, the second optical signal containing an optical channel which needs to be dropped in the plurality of optical channels, and optical channels contained in the second optical signal outputted from the wavelength selective switch being changed by adjusting a passband of the wavelength selective switch.

6. The reconfigurable optical add/drop multiplexing method according to claim 5, wherein the step of performing a coherent detection on the second optical signal includes:
    using a local oscillator to generate a local oscillating light at a local oscillating frequency; and
    performing the coherent detection on the second optical signal by using the local oscillating light so as to separate from the second optical signal the optical channel contained therein and outputting the separated optical channel.

7. The reconfigurable optical add/drop multiplexing method according to claim 6, wherein the optical channel separated from the second optical signal is changed by adjusting the local oscillating frequency.

* * * * *